United States Patent [19]

Regan

[11] Patent Number: 5,301,426

[45] Date of Patent: Apr. 12, 1994

[54] INSULATION STRIPPING TOOL

[76] Inventor: Robert R. Regan, 17 E. 42 St., Bayonne, N.J. 07002

[21] Appl. No.: 45,090

[22] Filed: Apr. 12, 1993

[51] Int. Cl.⁵ ............................................ B26B 27/00
[52] U.S. Cl. .................................................. 30/90.9
[58] Field of Search .................... 30/90.9, 90.3, 91.2, 30/90.4

[56] References Cited

U.S. PATENT DOCUMENTS 2,647,309  8/1953  Chisena ................................ 30/90.9
2,649,654  8/1953  Carta .................................... 30/90.9

Primary Examiner—Douglas D. Watts
Attorney, Agent, or Firm—Howard R. Popper

[57] ABSTRACT

A hand-held wire stripping tool for removing long sections of insulation from wire or cable of various diameters. The cable to be stripped is engaged between a pair of stepped sheaves on one side and a free-spinning, circular cutting blade on the other side. To accommodate different thicknesses of insulation, the axle of the cutting blade is journaled in a slidable mount that may be adjusted by turning a lead screw.

4 Claims, 1 Drawing Sheet

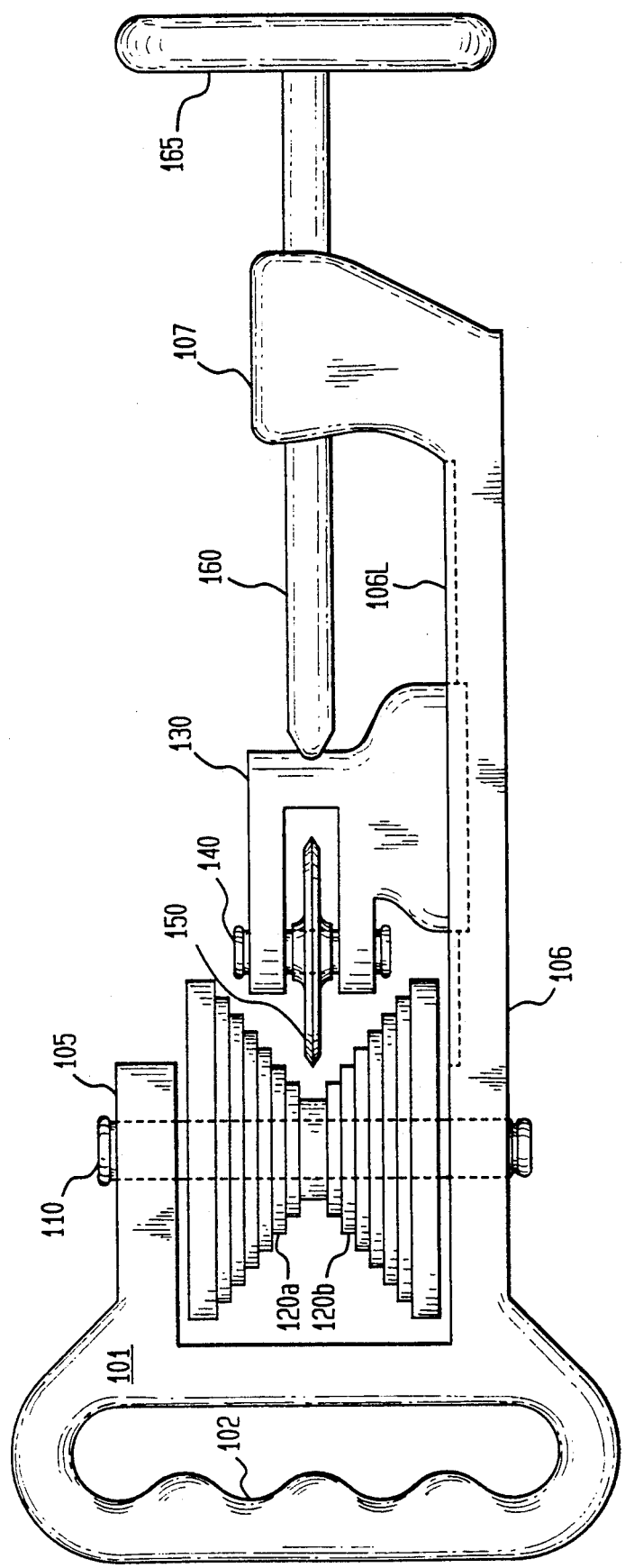

INSULATION STRIPPING TOOL

FIELD OF THE INVENTION

This invention relates to insulation stripping tools and more particularly to tools for stripping insulation from electrical wire.

BACKGROUND OF THE INVENTION

Conventional hand-held wire stripping tools are designed to remove a relatively short length of insulation from the end of an insulated conductor so that a high conductivity electrical connection can be made to the end of bare wire. A number of tool configurations have appeared. One popular type, long in use, employs a series of sharpened semi-circular notches cut in the opposing arms of a pair of hand-held scissors. Different size wire can be accommodated by being placed in the appropriate pair of semi-circular notches. The scissor arms are then closed together to cause the sharpened pair of notches to ring the insulation and cause it to be pierced through to the conductor core. Once so ringed the arms are relaxed slightly so that the tool can be moved along to widen the ring-shaped gap toward the free end of the wire thereby causing the cylinder of cut insulation to be removed.

While the notched scissor-arm design has seen long service and many refinements, its basic characteristic dictates that the degree of friction between the tool and the wire after the insulation has been ringed will be high. This occasions no particular difficulty when only a short length of insulation is to be removed from the end of the wire. However, when yards and yards of insulation are to be stripped, as may be the case when reel ends are to be prepared for scrapping, the conventional wire stripper generates so much friction that it cannot be efficiently utilized.

SUMMARY OF THE INVENTION

I have devised an improved, portable wire stripper that is especially suited for hand-stripping long sections of insulation from wire or cable. In one illustrative embodiment incorporating the principles of my invention, the wire to be stripped is slidably clamped between a pair of complementarily stepped rolling sheaves on one side and a free-spinning, circular cutting blade on the other side. The axles of the sheaves and of the cutting blade are parallel to each other. To accommodate different thicknesses of insulation, the axle of the cutting blade is journaled in a slidable mount that may be adjusted by turning a lead screw. The axle of the sheaves is journaled a handle to guide the tool along the entire length of cable to be stripped.

DESCRIPTION OF THE DRAWING

The foregoing objects and features of my invention are illustrated in the accompanying drawing, the single figure of which shows the improved stripping tool of my design.

DETAILED DESCRIPTION

Referring now to the drawing, the illustrative embodiment of the heavy duty wire stripping tool of my invention is designed and dimensioned to accommodate various sizes of insulated electrical wire or cable (not shown). The wire to be stripped is pinched between a vee-shaped spool 120A, 120B and free-spinning cutter wheel 150. The spool and the cutter wheel are mounted on tool frame so that they may be moved with respect to one another. The tool frame comprises a handle 101 positioned at its left hand side which is of a size to permit all four fingers of the hand to be accommodated. A series of finger nodules 102 in the left-hand side of the handle allows for a sure grasp of the tool.

The right-hand side of the tool frame handle articulates laterally to a fixed bracket having a pair of unequal length legs 105, 106. An axle 110 is journaled at its upper end into shorter leg 105 and at its lower end into longer leg 106. Vee-shaped spool 120 is supported on axle 110. Spool 120 has its oppositely tapered sheaves 120A, 120B advantageously cut into steps. Sheaves 120A, 120B have their minor diameters facing each other. Sheaves 120A, 120B are advantageously provided with a plurality of different diameter steps to accommodate different diameter cables which are to be stripped. Sheaves 120A, 120B may be integral, as shown in the drawing, or may be journaled on axle 110 with a wear-ring (not shown) therebetween so as to be independently rotatable.

Upper sheave 120A has its major diameter positioned adjacent leg 105 and lower sheave 120B has its major diameter positioned adjacent leg 106. To the right of the major diameter of lower sheave 120B the longer leg 106 of the tool frame is provided with a T-shaped cross-section having lips 106L at its upper surface. Movable bracket 130 is mounted on the upper surface of leg 106 slidably engaging lips 106L. Axle 140 which carries circular cutter wheel 150 is journaled into slidable bracket 130. Slidable bracket 130 may be moved to any desired position along leg 106 by advancing lead screw 160. Lead screw 160 at its left-hand end is retentively journaled into the right-hand side of slidable bracket 130. Lead screw 160 is threaded into the stationary further fixed bracket 107 at the right-hand end of leg 106 of frame 101. Lead screw 160 is rotated by lead screw handle 165 so as to bring cutter 150 closer to or farther away from spool 120 to accommodate different diameters of wire or cable and to penetrate any desired thicknesses of insulation thereon.

In operation, lead screw handle 165 will first normally be rotated to withdraw cutter 150 away from spool 120 so that the wire or cable to be stripped can be inserted between spool 120 and cutter 150. Lead screw handle 165 is then rotated in the opposite direction to bring cutter wheel 150 sufficiently against the wire or cable insulation so that it pierces the insulation surrounding the conductor core of the wire or cable to be stripped. The wire or cable is then passed between spool 120 and cutter wheel 150 so that the entire length of the insulation covering the core may be slit. Advantageously this may be accomplished by the user securing one end of the cable and walking towards the other end while holding the tool by handle 101 and/or handle 165 or both. Alternatively, the user may desire to hold the tool stationary and pull the cable or wire through between spool 120 and cutter 150.

The illustrative embodiment has been depicted with cutter wheel 150 journaled into movable bracket 130 and spool 120 journaled into legs 105 and 106. However, it should be apparent that the positions of spool 120 and cutter wheel 150 may be reversed so that the cutter wheel is journaled into legs 105 and 106 and spool 120 is journaled into movable bracket 130. In addition, leg 106 may be extended to the right of block 107 to provide for an additional handle similar to handle 101 for two handed operation. Further and other modifications will be apparent to those skilled in the art without however departing from the spirit and scope of my invention.

What is claimed is:

1. A tool for stripping the insulation from wire or cable, comprising a frame exhibiting a fixed and a slidable bracket and a further fixed bracket, a free-spinning cutting wheel and a vee-shaped shaped spool respectively journaled into said fixed and said slidable bracket, said spool including a plurality of different diameter, independently rotatable sheaves and said spool and said cutting wheel having substantially parallel axes, means including a lead screw retentively journaled between said slidable bracket and said further fixed bracket for positioning said cutting wheel and said spool relative to each other to determine the penetration of said cutting wheel into said insulation, said cutting wheel and said spool being caused to rotate when said tool is pulled along said wire or cable.

2. The stripping tool of claim 1 wherein said frame includes a handle at each of its ends.

3. The stripping tool of claim 1 wherein said handle at one of said ends is attached to said lead screw.

4. The stripping tool of claim 1 wherein said spool is a Vee-shaped sheave.

* * * * *